United States Patent
Vetterling et al.

(10) Patent No.: US 12,059,751 B2
(45) Date of Patent: Aug. 13, 2024

(54) SYSTEM AND METHOD FOR DETECTING AND CORRECTING LASER-CUTTING DISTORTION

(71) Applicant: Mitsubishi Electric Research Laboratories, Inc., Cambridge, MA (US)

(72) Inventors: William Vetterling, Cambridge, MA (US); Jay Thornton, Watertown, MA (US); Ankush Chakrabarty, Cambridge, MA (US); Abraham Goldsmith, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1081 days.

(21) Appl. No.: 16/831,885

(22) Filed: Mar. 27, 2020

(65) Prior Publication Data
US 2021/0299795 A1   Sep. 30, 2021

(51) Int. Cl.
*G05B 19/4155* (2006.01)
*B23K 26/38* (2014.01)
*B23K 31/00* (2006.01)
*G05B 19/408* (2006.01)

(52) U.S. Cl.
CPC ............ *B23K 31/003* (2013.01); *B23K 26/38* (2013.01); *G05B 19/4083* (2013.01); *G05B 19/4155* (2013.01); *G05B 2219/36199* (2013.01); *G05B 2219/45041* (2013.01)

(58) Field of Classification Search
CPC .............. B23K 31/003; B23K 26/38; B23K 2101/185; B23K 2103/36; B23K 2103/40; B23K 2103/42; B26D 5/005; G05B 19/4083; G05B 19/4097; G05B 19/4155; G05B 2219/36199; G05B 2219/45041;
(Continued)

(56) References Cited

U.S. PATENT DOCUMENTS

| | | | | |
|---|---|---|---|---|
| 6,229,114 B1 * | 5/2001 | Andrews | ................. | B41J 2/14 |
| | | | | 219/121.72 |
| 9,104,192 B2 * | 8/2015 | Brand | ................. | G05B 19/4103 |
| 10,195,682 B2 * | 2/2019 | Fagan | ................. | B23K 31/10 |

(Continued)

FOREIGN PATENT DOCUMENTS

| CN | 112894166 B | * 10/2023 | ............. B23K 26/38 |
|---|---|---|---|
| JP | 2005334919 A | * 12/2005 | ............. B23K 26/00 |

(Continued)

*Primary Examiner* — M. N. Von Buhr
(74) *Attorney, Agent, or Firm* — Gene Vinokur; Hironori Tsukamoto

(57) ABSTRACT

A system for generating a G-code for controlling an operation of a laser-cutting machine to cut parts from a sheet of material, upon receiving cutting data specifying a cutting order of parts and a cutting order of edges of each part, tests the parts for potential distortions and generates a G-code to avoid the potential distortion. For testing a current part, the system detects a potential distortion when the final edge of the current part is adjacent to an edge of a previously cut part scheduled for cutting before the current part according to the cutting order of parts. The system modifies the cutting order to select the modified cutting order for which the final edge is not adjacent to any edge of any previously cut part.

20 Claims, 15 Drawing Sheets

(58) Field of Classification Search
CPC .......... G05B 2219/35303; G05B 2219/36252; Y02P 90/02
See application file for complete search history.

(56) References Cited

U.S. PATENT DOCUMENTS

| | | | | |
|---|---|---|---|---|
| 11,249,453 | B2* | 2/2022 | Kurohara | ................ G05B 19/19 |
| 2008/0053977 | A1* | 3/2008 | Yamazaki | .......... B23K 26/0626 |
| | | | | 219/121.83 |
| 2014/0005804 | A1 | 1/2014 | Merl | |
| 2016/0048124 | A1* | 2/2016 | Madhavan | ......... G05B 19/4097 |
| | | | | 700/173 |

FOREIGN PATENT DOCUMENTS

| | | | | |
|---|---|---|---|---|
| JP | 2008055438 A | * | 3/2008 | ......... B23K 26/0626 |
| JP | 2015516603 | | 6/2015 | |
| WO | WO-2021192728 A1 | * | 9/2021 | ............. B23K 26/38 |

* cited by examiner

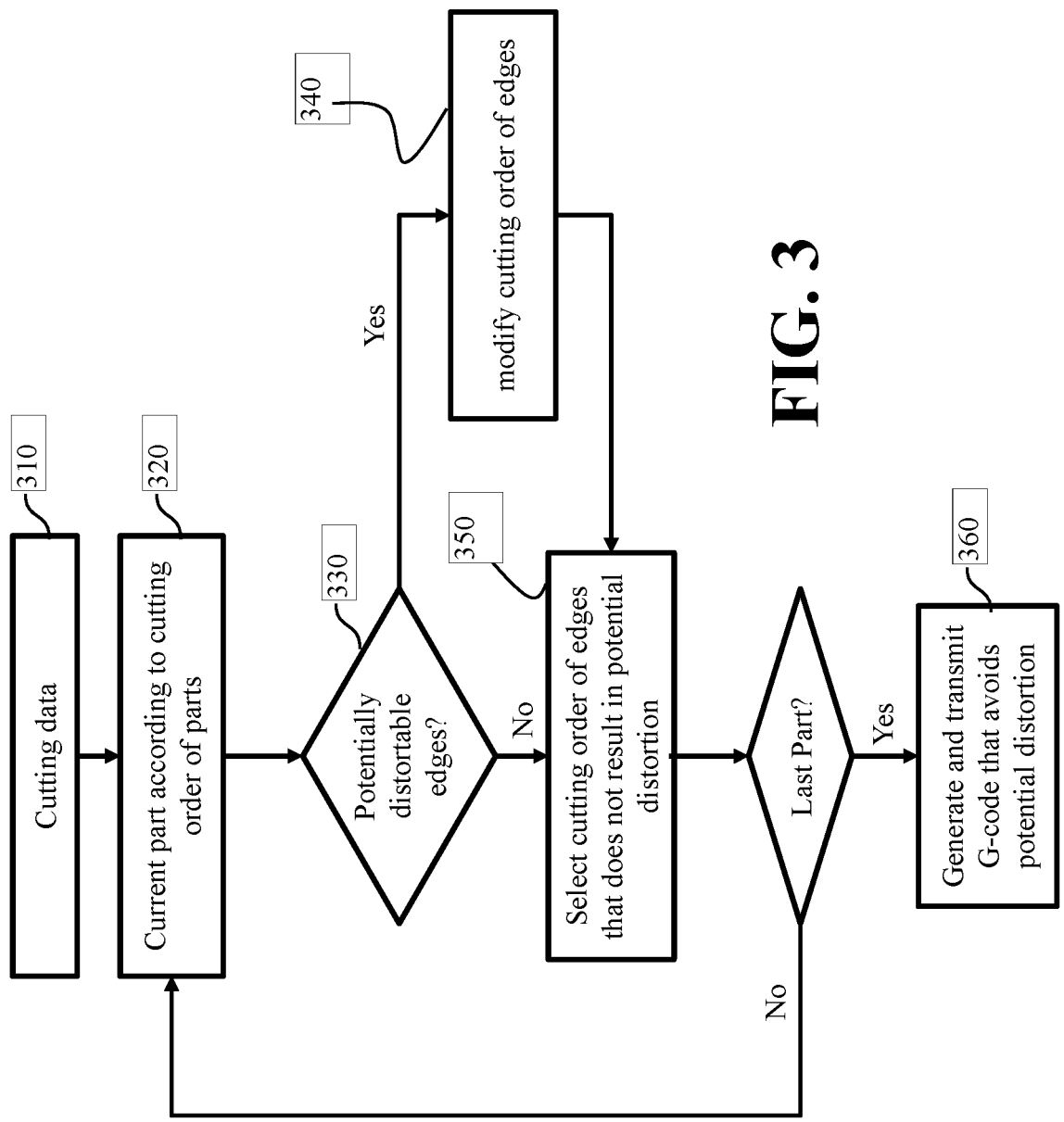

SYSTEM AND METHOD FOR DETECTING AND CORRECTING LASER-CUTTING DISTORTION

TECHNICAL FIELD

This invention relates generally to laser-cutting machines, and more particularly to detection and correction of cut-edge distortion in laser-cutting machine.

BACKGROUND

Laser-cutting is a technology that allows metals and non-metallic materials to be cut by a laser. While typically used for industrial manufacturing applications, laser-cutting is also starting to be used by schools, small businesses, and hobbyists. Laser-cutting works by directing the output of a high-power laser through optics to a material to be cut. In general, laser-cutting machines including laser cutter heads are configured to implement the laser-cutting technology. The conventional laser-cutting machines follow instructions for a pattern to be cut out from a material. A focused laser beam is directed at the material, which then either melts, burns, vaporizes away, or is blown away by a jet of gas in accordance with the instructions, and thus leaves an edge with a high-quality surface finish. The laser-cutting machines are used to cut flat-sheet material as well as structural and piping materials.

Generally, the laser cutter head of the laser-cutting machine is translated in a bounded plane along orthogonal axes. Laser cutter heads are often used to cut parts from plastic and metal sheets of varying thickness. Control of the laser cutter head is usually performed by a controller (such as a computer numerical controller (CNC)) in the laser-cutting machine based on programming instructions.

The CNC follows a prescribed instruction list known as "G-code." The G-code is the common name for the most widely used numerical control (NC) programming language. It is used mainly in computer-aided manufacturing to control automated machine tools such as the CNC. The G-code is a language that is used to tell computerized machine tools how to make something. The "how" is defined by G-code instructions provided to a machine controller (industrial computer) that tells motors where to move, how fast to move, and what path to follow.

During the laser-cutting process, a thermal interaction and a mechanical interaction occur between the material and laser-cutter being controlled by its parameters and the G-code. A heat affected zone (HAZ) is created in a region of the material that has not melted but whose microstructure and mechanical properties were affected by the heat generated during laser-cutting. The heat affected zone may lead to undesirable effects. For example, in some situations, the laser-cutting of sheet metal can result in distortion of the cut-edge.

Therefore, there is a need to develop a system, for laser-cutting machines, that provides distortion free parts by the laser-cutting operation.

SUMMARY

It is an object of some embodiments to prevent distortions of parts cut by a laser-cutting machine from a sheet of material. Additionally, or alternatively, it is an object of some embodiments to address a cause of the potential distortion and to reduce occurrences of such a distortion before executing laser-cutting operation.

Some embodiments are based on observation that in some situations the edges of the parts cut from a sheet of material are distorted. For example, instead of having a straight edge as planned for cutting, a part may have an edge bowed out from the shape of the part and therefore manifesting in a "rocking" behavior when the part is placed on that distorted edge atop a flat surface. For example, as the parts are cut from the material, heat from the laser-cutting process diffuses into the part itself and into the remaining material between parts. In some cases, the material between parts may be long and thin, referred herein as a strut. When heat is trapped in thin struts between parts, the parts experience thermal expansion and this expansion can move the sheet being cut thereby causing the cut part to have distorted edges.

To that end, potentially distorted edges of the parts cut from the sheet of material are detected in advance by simulating the laser-cutting operation, i.e. executing a laser-cutting operation on a virtual system using instructions associated with cutting the parts in real.

Some embodiments are based on the observation, guided by thermal and mechanical models, that not all edges of a part might exhibit this bowing distortion, but typically only the final edge that is cut last for each part. For example, if a part has a shape of a square, a laser cutter cuts this part from the sheet of material by cutting a sequence of four straight edges, one for each side of the square. It is observed that only the final edge that is cut last to finish the cutting of the part may have this distortion. The bowing distortion is not observed for cutting the other three edges. To that end, in some embodiments, only the final cut edge that is cut last for each part is considered as a candidate for potential distortion based on instructions associated with cutting the parts from the sheet of material.

It is further observed that at least two conditions need to be satisfied to potentially cause the distortion. The first condition is that the distortion takes place for the edge of a part that is cut last to finish the cutting of the shape of the part. The second condition is that the cutting of that final edge should be alongside a previously cut part. Further, some embodiments are based on the realization that only satisfaction of these two conditions in the cutting may potentially cause the bowing distortion.

Some embodiments are based on the realization supported with some experiments that the bowing distortion is caused by nuances of thermal propagation during the laser-cutting. For example, thermal simulations of the laser-cutting process revealed that the distortion effect along edges of cut parts is primarily due to heat buildup that occurs when heat becomes trapped between two parts that are processed sequentially in time. Further, the distortion effect occurs primarily in cases where a region in between sequentially processed parts forms a thin strut, e.g., when a ratio of a shared edge length (i.e., a common region of adjacent edges of parts) to a distance between the parts is larger than a threshold. The value of the threshold depends on property of material to be cut and the shared edge length. However, the parts to be cut are typically placed densely on a worksheet, so in a number of cases the strut is thin enough to cause the distortion.

Further, it is observed that near the end of cutting a part, the cutting may form a thin strut with a previously cut part and the heat deposited in the sheet of material by the current laser-cutting process cannot escape across the previous cut and is trapped inside the thin strut. This trapped heat causes thermal expansion of the thin strut. Because this is the last cut on the part, only the expanding thin strut supports the position of the part being cut, and so the strut and the part may move slightly relative to the original coordinate system used by the laser-cutting head. In this case, the laser cut is not in the correct location causing the distortion of the part.

Some embodiments are based on the realization that because the bowing distortion is caused by thermal expansion under conditions created by the sequence of cutting, the problem of potential bowing distortion can be reduced by changing the order of cutting. For example, in some cases the distortion can be eliminated by changing the cutting direction such that the final edge to be cut is not along a thin strut induced by the adjacent edge of previously cut part. For laser-cutting, programming instructions (i.e. G-code) specify the cutting order. To that end, some embodiments either address the cause of the distortion during the original design of the G-code data or, for previously constructed G-code detect cut sequences in the incoming G-code data that potentially cause distortion and modify the order of cutting in the detected sequences to reduce the likelihood of the distortion.

Some embodiments are based on understanding that the formation of the thin strut between two parts can be easily detected when the parts have a rectangular shape and are aligned on a sheet of material. However, this is not always the case in a number of laser-cutting applications. Hence, there is a need to detect the potential distortion for cutting parts of arbitrarily shapes arranged in an arbitrarily pattern on a sheet of material.

In some embodiments, the distortion is detected by utilizing image processing techniques, such as morphological dilation. The morphological dilation operation results in generation of a dilated shape around outlines of the parts to which the morphological dilation operations are applied. In some embodiments, the potential detection of a current part is detected when at least a portion of the final edge of the part intersects the dilated shape of a previous part scheduled to be cut before the current part. In effect, the morphological dilation simplifies detection of the thin strut that can cause the potential bowing distortion of parts of arbitrarily shapes.

Additionally, or alternatively, some embodiments are based on understanding that the thin strut that can cause the potential bowing distortion does not have to be formed only between two parts, but can form between one part and a combination of previously cut parts. To address this issue, some embodiments maintain a binary image of the sheet of material with pixels of previously cut space corresponding to locations of the previously cut parts dilated by a kernel of a morphological dilation having one value and all other pixels having a different value. Such a binary image allows detection of the potential distortion when at least a portion of the final edge of the current part is within a boundary of the previously cut space. In addition, after processing the current part, some embodiments add the morphological dilation of the current part to the previously cut space of the binary image by flipping values of pixels corresponding to the morphological dilation of the current part. In such a manner, the binary image is formed for testing next parts for the potential distortions.

In such a manner, various embodiments test the cutting data specifying the cutting order of parts and edges of each part for potential distortions, and modify/select the cutting orders of edges of different parts that avoid the potential distortion. The embodiments generate a G-code with the cutting order of the edges of the current part selected to avoid the potential distortion and transmit the generated G-code over a wired or wireless channel to control the laser-cutting machine.

BRIEF DESCRIPTION OF THE DRAWINGS

The presently disclosed embodiments are further explained with reference to the attached drawings. The drawings shown are not necessarily to scale, with emphasis instead generally being placed upon illustrating the principles of the presently disclosed embodiments.

FIG. 3 shows a flow chart of a method for generating a G-code for controlling an operation of a laser-cutting machine to cut parts from a sheet of material so as to avoid potential distortion of the parts according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
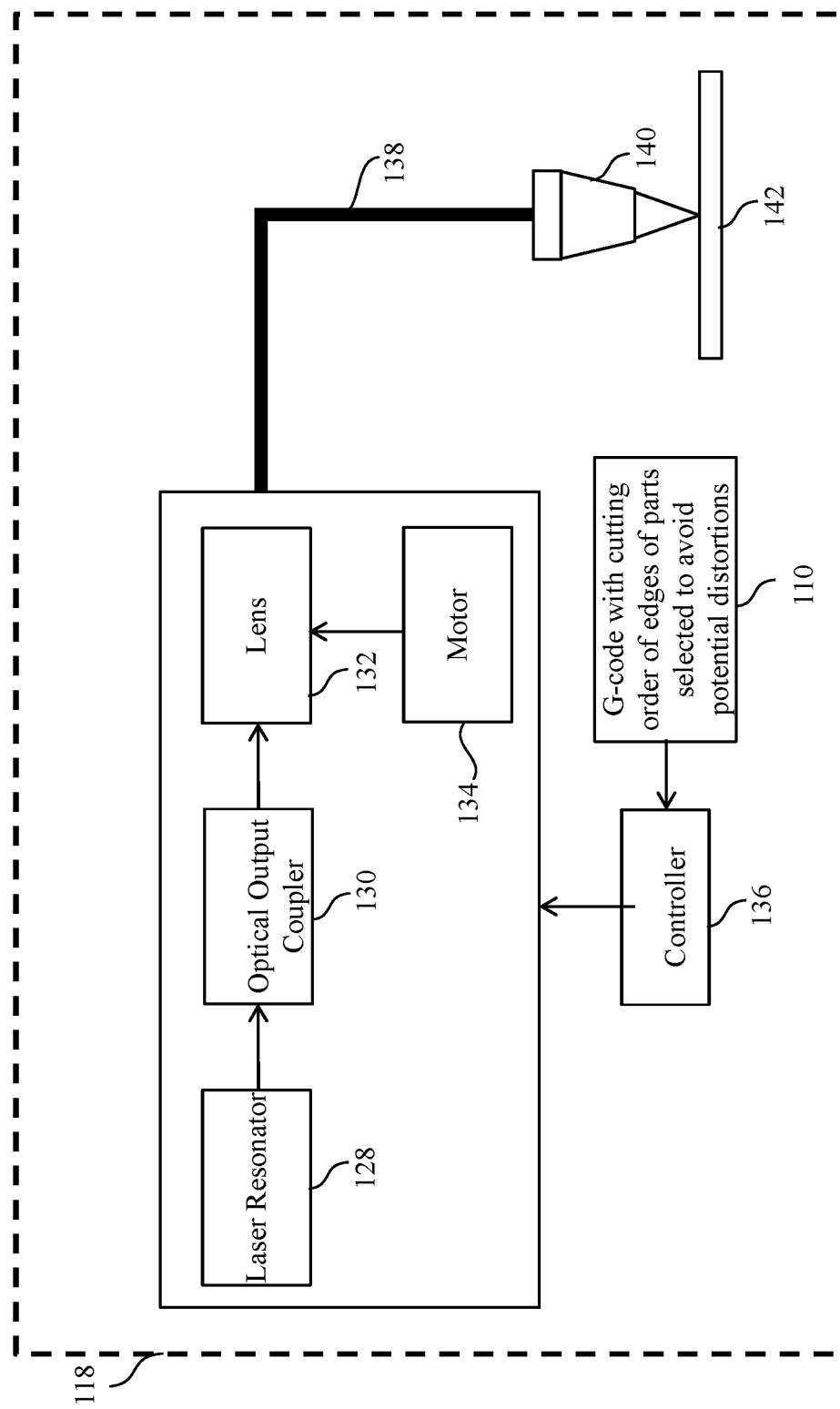
FIG. 1A shows a block diagram of an exemplar laser-cutting machine 118 controlled according to principles employed by some embodiments.

FIG. 1A shows a block diagram of an exemplar laser-cutting machine 118 controlled according to principles employed by some embodiments. In this example, the laser-cutting machine 118 includes a laser resonator 128 that generates a laser beam 138 for cutting the parts from the sheet of material 142. Further, the laser-cutting machine 118 includes an optical output coupler 130 and a lens 132 in order to focus the laser beam 138 output from the laser resonator 128. The laser-cutting machine 118 further includes a motor 134 (also known as an actuator), a controller 136, and a laser-cutting head 140. In some embodiments, the controller 136 is a computer numerical controller (CNC).

The controller 136 controls the operation of the laser-cutting machine 118 according to G-code 110 specifying commands for the laser-cutting machine 118 to cut parts from a sheet of material. The controller 136 is configured to receive the G-code 110 and execute the received G-code to control the motor 134 to position the laser-cutting head 140 as well as to control the ON/OFF states of the laser resonator 128 itself. In certain embodiments, the operations may include controlling orientation of the laser-cutting head 140 in accordance with the G-code to cut the parts from the sheet of material 142. In other embodiments, controlling the operations of the laser-cutting machine 118 includes controlling of cutting rate, nozzle alignment with respect to the laser head 140 of the laser-cutting machine 118 and the like.

In various embodiments, the G-code 110 is generated with cutting order of edges of parts selected to avoid potential distortions caused by heat trapping in a strut formed between cuttings of different parts. Various embodiments generate the G-code 110 in advance to address the cause of the potential distortion and to reduce occurrences of such a distortion before executing laser-cutting operation. To that end, potentially distorted edges of the parts cut from the sheet of material are detected in advance by simulating the laser-cutting operation, e.g., by executing a laser-cutting operation on a virtual system using instructions associated with cutting the parts in real. Such a testing can be performed by a processor of the laser-cutting machine 118 before the cutting and/or by a remote machine communicatively connected with the laser-cutting machine 118.

Figure 1B:
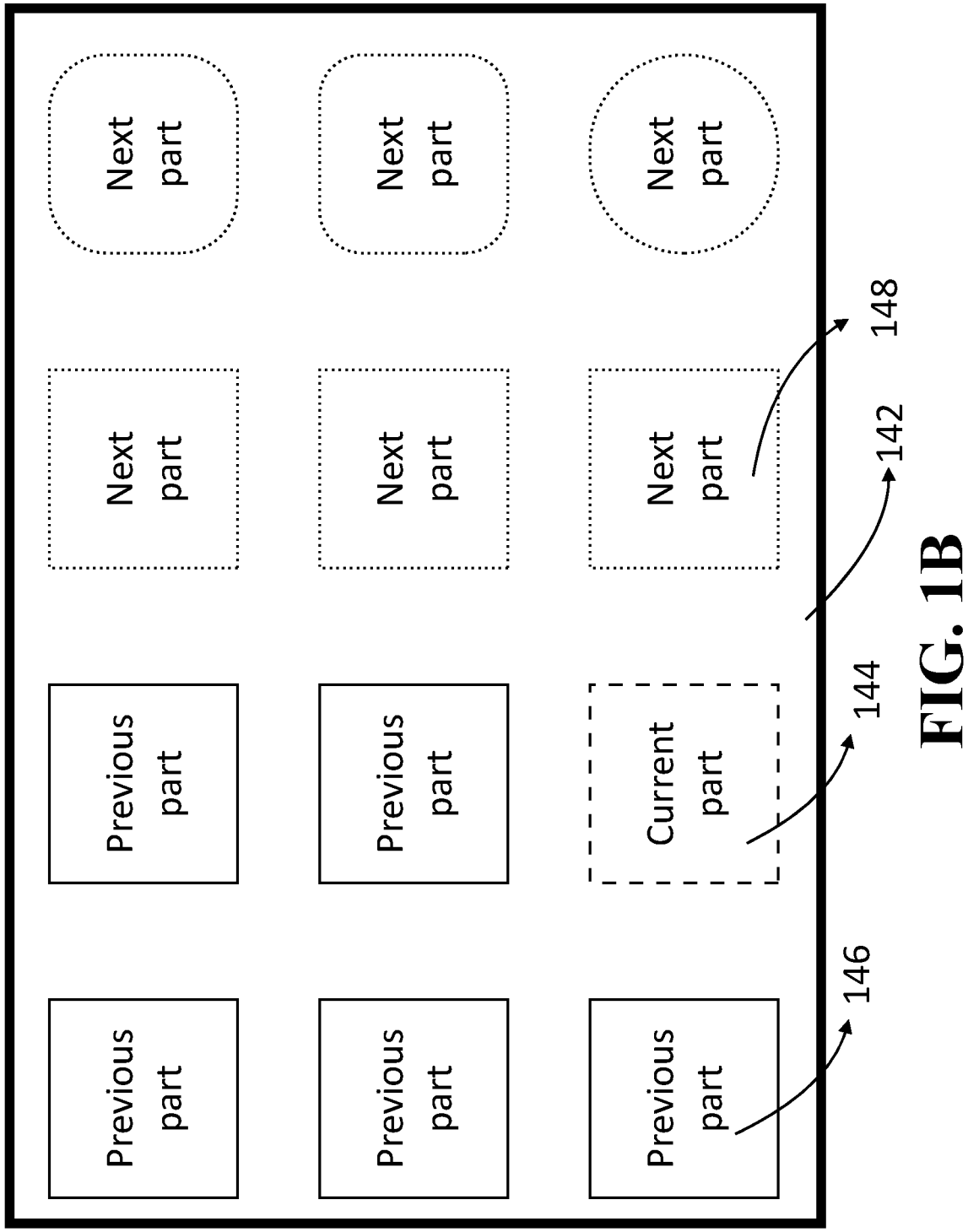
FIG. 1B shows an example of a sheet of material 142 to be cut by a laser-cutting machine 118 according to some embodiments.

FIG. 1B shows an example of a sheet of material 142 to be cut by a laser-cutting machine 118 according to some embodiments. During laser-cutting operations, the sheet of material 142 is associated with at least three types of parts such as: one or more parts that have been cut from the sheet of material 142 as "previous part 146", a part currently being cut from the sheet of material 142 as "current part 144", and one or more parts to be cut from the sheet of material 142 after the current part 144 as "next part 148". In some embodiments, a final edge of the current part 144, an adjacent edge of the previous part 146, and an adjacent edge of the next part 148 are straight edges. In some other embodiments, the current part 144 has a shape of a rounded rectangle formed by edges having straight segments connected with arcs.

Some embodiments are based on observation that in some situations the edges of the parts cut from a sheet of material are distorted. For example, instead of having a straight edge as planned for cutting, a part may have an edge bowed out from the shape of the part and therefore manifesting in a "rocking" behavior when the part is placed on that distorted edge atop a flat surface. For example, as the parts are cut from the material, heat from the laser-cutting process diffuses into the part itself and into the remaining material between parts. In some cases, the material between parts may be long and thin, referred herein as a strut. When heat is trapped in thin struts between parts, the parts experience thermal expansion and this expansion can move the sheet being cut thereby causing the cut part to have distorted edges that can result in rocking motions when the parts are placed along a flat surface along the distorted edge.

Some embodiments are based on the observation guided by thermal and mechanical models that not all edges of a part might exhibit this bowing distortion, but typically only the final edge that is cut last for each part. For example, if a part has a shape of a square, a laser cutter cuts this part from the sheet of material by cutting a sequence of four straight edges, one for each side of the square. It is observed that only the final edge that is cut last to finish the cutting of the part may have this distortion. The bowing distortion is not observed for cutting the other three edges. To that end, in some embodiments, only the final edge that is cut last for each part is considered as a candidate for potential distortion based on instructions associated with cutting the parts from the sheet of material.

It is further observed that at least two conditions need to be satisfied to potentially cause the distortion. The first condition is that the distortion takes place for the edge of a part that is cut last to finish the cutting of the shape of the part. The second condition is that the cutting of that final edge should be alongside a previously cut part. Further, some embodiments are based on the realization that only satisfaction of these two conditions in the cutting may potentially cause the bowing distortion.

Figure 2:
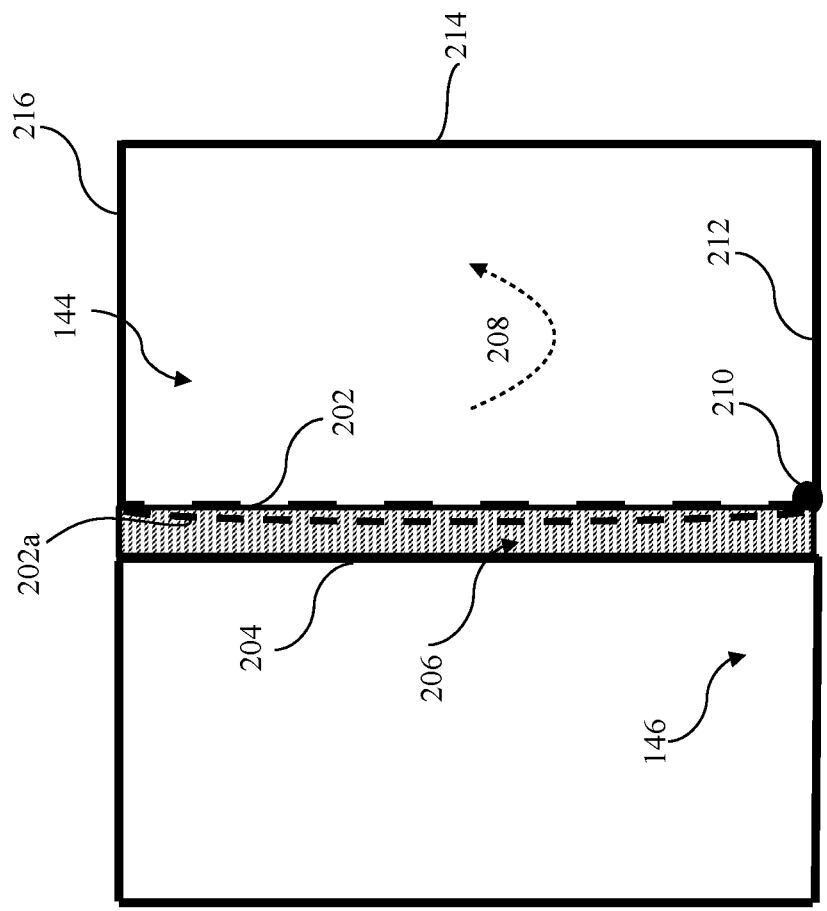
FIG. 2 shows a schematic of cutting a part that can result in a potential distortion of edges of the part during its cutting according to principles employed by some embodiments.

FIG. 2 shows a schematic of cutting a part that can result in a potential distortion of edges of the part during its cutting according to principles employed by some embodiments. In this example, the current part 144 is cut after the previous part 146 according to a predetermined cutting order of parts. The cutting order of parts is contained in the cutting data that can be generated in advance or just before the cutting. One example of the cutting data is provided in G-code specifying cutting operation for the laser-cutting machine 118. Additionally, or alternatively, the cutting data can be determined by a computer aided manufacturing (CAM) program processing a computer aided design (CAD) file specifying geometry of the parts to be cut by the laser-cutting machine. Various embodiments test the cutting data for potential distortion before the cutting and generate G-code from the cutting data that avoids the potential distortions.

In addition to the cutting order of the parts, the cutting data can include the cutting order of edges of each part. In the example of FIG. 2, the cutting order for cutting edges of part 144 is in counterclockwise direction 208 starting from the starting point 210. According to this cutting order, the edge 212 is cut first, then the edge 214 is cut followed by the edge 216 and the edge 202. Hence, in this example, the edge 202 is the final edge scheduled to be cut last in cutting of the current part 144.

In this example, the final edge 202 is adjacent to an edge 204 of the previously cut part 146 forming a strut 206. If the laser cutting proceeds according to the cutting order of this example, the laser-cutting operations would deposit heat in the sheet of material 142 while the previous part 146 is cut from the sheet of material 142. The deposited heat further propagates in the sheet of material 142 from the edge 204 of the previous part 146 that has been cut. The same process occurs during the cutting of part 144, but in this case when the deposited heat from the final edge 202 propagates in the direction of the part 146, that heat transfer is halted by the air gap caused by the nearby edge of 204 of the part 146 so that the heat is trapped in the thin strut 206 and consequently the temperature of the thin strut 206 is elevated and the strut experiences the physical forces of thermal expansion. During the cutting of the final edge 202, the only attachment that the current part 144 has to the sheet of material 142 is through the thin strut 206 which is undergoing the stress of thermal expansion. This stress can deform the thin strut 206 and thereby move the part 144 causing the laser cutter to make the last cut 202 tracing a slightly unexpected path on the sheet 142, thereby causing distortion of that edge 202. Thus, due to the heat trapped in the strut 206 during the laser-cutting operations, the final edge 202 is shifted to an edge 202a of the current part 144 which leads to bowing distortion in edges (i.e., the edge 202a) of the current part 144. For clarity, FIG. 2 shows a gradual bowing from end to end, but this gradual bowing is not always the case. Sometimes the distortion is much more localized on the final cut edge.

Some embodiments are based on the realization that because the bowing distortion is caused by thermal expansion under conditions created by the sequence of cutting, the problem of potential bowing distortion can be reduced by changing the order of cutting. For example, in some cases the distortion can be eliminated by changing the cutting direction such that the final edge to be cut is not along a thin strut induced by the adjacent edge of previously cut part. For laser-cutting, programming instructions (i.e. G-code) specify the cutting order. To that end, some embodiments either address the cause of the distortion during the original design of the G-code data or, for previously constructed G-code detect cutting sequences in the incoming G-code data that potentially cause distortion and modify the order of cutting in the detected sequences to reduce the likelihood of the distortion.

FIG. 3 shows a flow chart of a method for generating a G-code for controlling an operation of a laser-cutting machine to cut parts from a sheet of material that avoids potential distortion of the parts according to some embodiments. The method uses a processor coupled with stored instructions implementing the method. The instructions, when executed by the processor carry out steps of the method.

Upon receiving cutting data 310 specifying a cutting order of parts and a cutting order of edges of each part, the method tests the parts, i.e., cutting data of each part, for potential distortions caused by the cutting according to the cutting data. For example, the method tests parts sequentially according to the cutting order of the parts received in the cutting data 310. For testing a current part 320 specified by the cutting order of parts, the method detects 330 a potential distortion for cutting a final edge of the current part according to the cutting order of edges for the current part, when the final edge of the current part is adjacent to an edge of a previously cut part scheduled for cutting before the current part according to the cutting order of parts. If the potential distortion is detected, the method modifies 340 the cutting order of the edges of the current part and selects 350 the modified cutting order for which the final edge is not adjacent to any edge of any previously cut part, such that the selected cutting order does not result in the potential distortion of cutting the current part. If the potential distortion is not detected, the original cutting order of parts can be selected 350.

If the current part is not the last part to cut according the cutting order of parts, the next part is processed for detecting potential distortions. Otherwise, the method generates 360 a G-code with the cutting order of the edges of the current part selected to avoid the potential distortion and transmits the generated G-code over a wired or wireless channel to control the laser-cutting machine. Thus, when the laser-cutting machine would cut the parts according to the G-code generated by some embodiments, the potential distortions caused by heat trapping in a thin strut can be avoided.

Different embodiments can modify the cutting order in the same or different manners. For example, some embodiments modify the cutting order of the edges of the current part from a clockwise order to a counterclockwise order or from the counterclockwise order to the clockwise order. Additionally, or alternatively, some embodiments modify the cutting order of edges of the current part by changing a location of an initial starting point of cutting the edges of the current part.

Figure 4A:
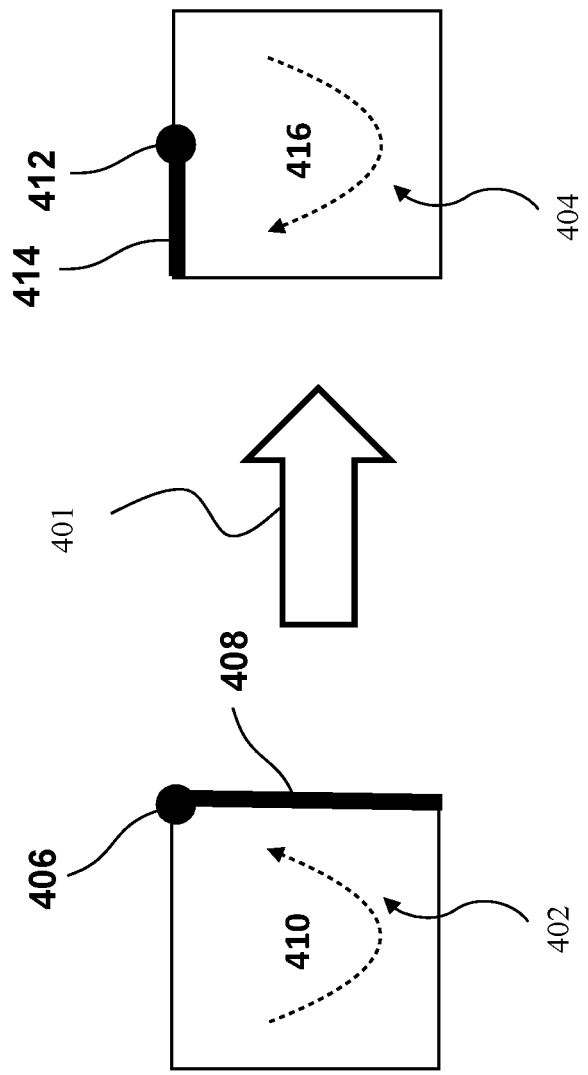
FIG. 4A shows a schematic of modification and selection of cutting order that avoids potential distortion according to one embodiment.

FIG. 4A shows a schematic of modification and selection of cutting order that avoids potential distortion according to one embodiment. FIG. 4A shows a part with a cutting order 402 defining a final edge 408 by way of specifying an initial starting point of cutting 406 (i.e., top right corner of the part 402), and the cutting order in a counterclockwise direction 410. In this example, the cutting order of the edges of part 402 is modified 401 to form a cutting order of edges 404. The cutting order 404 results in a final edge 414 by specifying a modified initial starting point of cutting 412 (i.e., middle of an edge the part 404), and a modified cutting order in a clockwise direction 416.

Figure 4C:
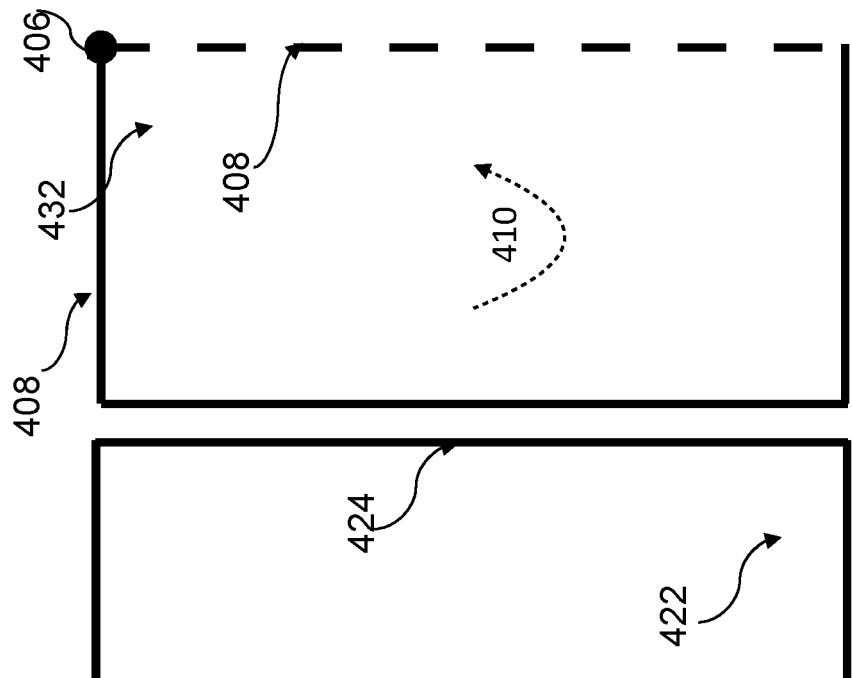
FIGS. 4B and 4C show schematics of modification and selection of cutting order that avoids potential distortion according to another embodiment.
Figure 4B:
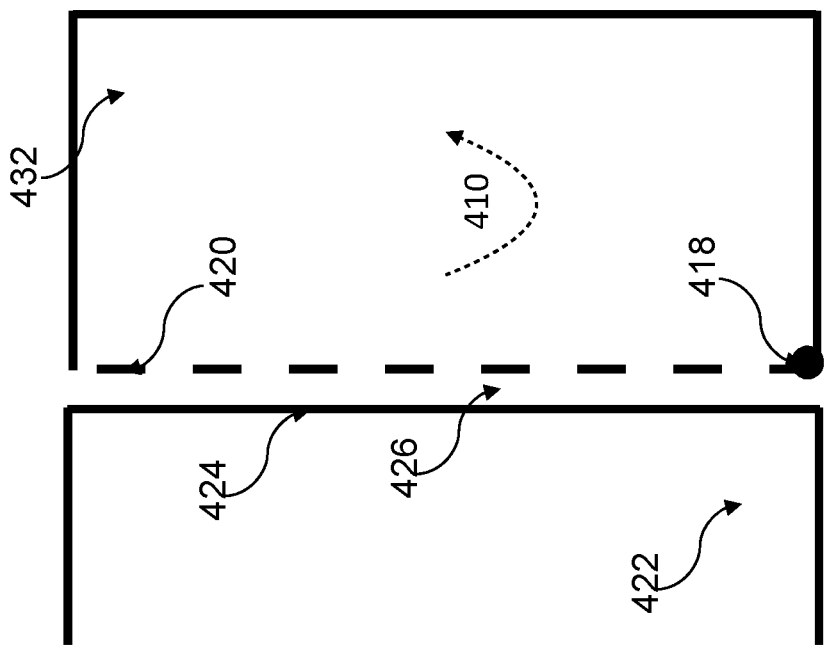

FIGS. 4B and 4C show schematics of modification and selection of cutting order that avoids potential distortion according to another embodiment. In FIG. 4B, a previous part 422 is cut before the current part 432, where the previous part 422 has an edge 424. The current part 432 has the initial starting point of cutting 418, a counterclockwise cutting direction 410 and the final edge 420 forming a strut 426 with the edge 424 of the previous part 422. FIG. 4C shows a schematic of modification of the cutting order of the part 432 to avoid formation of the strut 426 during the final cutting. In this example, the cutting order is modified by changing the initial starting point of cutting 418 to a point 406, while preserving the counterclockwise cutting direction 410.

By way of an example, referring to FIG. 4B, the cutting order for cutting the current part 402 specifies that the initial starting point of cutting 418 of the current part 432 is at a bottom left corner and the cutting order of the current part 432 is the counterclockwise order 410. Accordingly, the current part 432 is cut by the laser cutting machine 118 in such a way that the final edge 420 of the current part 420 is adjacent to the edge 424 of the previous part 422. Due to formation of the strut 426 in the sheet of material 142 between the final edge 420 and the adjacent edge 424 of the previous cut part 422, the heat from the cutting edge 420 may not diffuse past the previous cut 424 and that heat is trapped in the thin strut 426. The elevated temperature in the thin strut causes thermal expansion and stress in the thin strut 426. Since the current part 432 is attached to the sheet 142 only through the thin strut 426, that thermal expansion and stress in the thin strut 426 can cause the motion of the part 432 so that, although the laser cutter moves in a straight line, the edge 420 traced on the sheet surface has bowing distortions. Accordingly, the distorted current part 432 from the sheet of material 142 is obtained. The selection of the different cutting order, shown by the way of example on FIG. 4C, helps to avoid such a distortion.

The cutting order of parts is part of cutting data that can be generated in advance or just before the cutting. One example of the cutting data is provided in G-code specifying cutting operation for the laser-cutting machine 118. G-code is a programming language for controlling computer-automated machine tools such as lather-cutters, milling machines, and drills. Each command is typically composed of a letter followed by a number, such as G01, or a series of letter/number combinations, such as "G01 X205. Y330." In this example, the instruction provided in G-code is to cut a linear path (G01) from the current location to the location X,Y=(205, 330) mm.

The G-code language can have hundreds of codes specifying different commands to control an operation of laser-cutting machine. Typically, commands of G-code include the cutting data and laser data specifying modes of operation of the laser-cutting machine. For example, a command "G00 X295. Y300." commands the laser-cutter to do fast scan, laser off, to X, Y=(295,300) mm. A command "M98 P9010" commands to turn the laser on and to pierce sheet. In such a manner, the cutting data of the G-code specifies the path for moving a laser head of a cutter, and the specific modes of the operation when the laser head is at different locations to do the actual cutting.

Notably, G-code can have a complicated structure designed to be executed by a processor. For instance, in this example, M98 portion of the G-code actually calls a subroutine for piercing the sheet, and P9010 portion provides the address, e.g., in a memory, of the routine. Hence, it is not always possible to understand the G-code commands to be executed just by looking into the G-code. To that end, some embodiments execute a laser-cutting simulator to simulate motion of the laser head to determine the cutting order of the parts and the cutting order of the edges of each part.

Figure 5A:
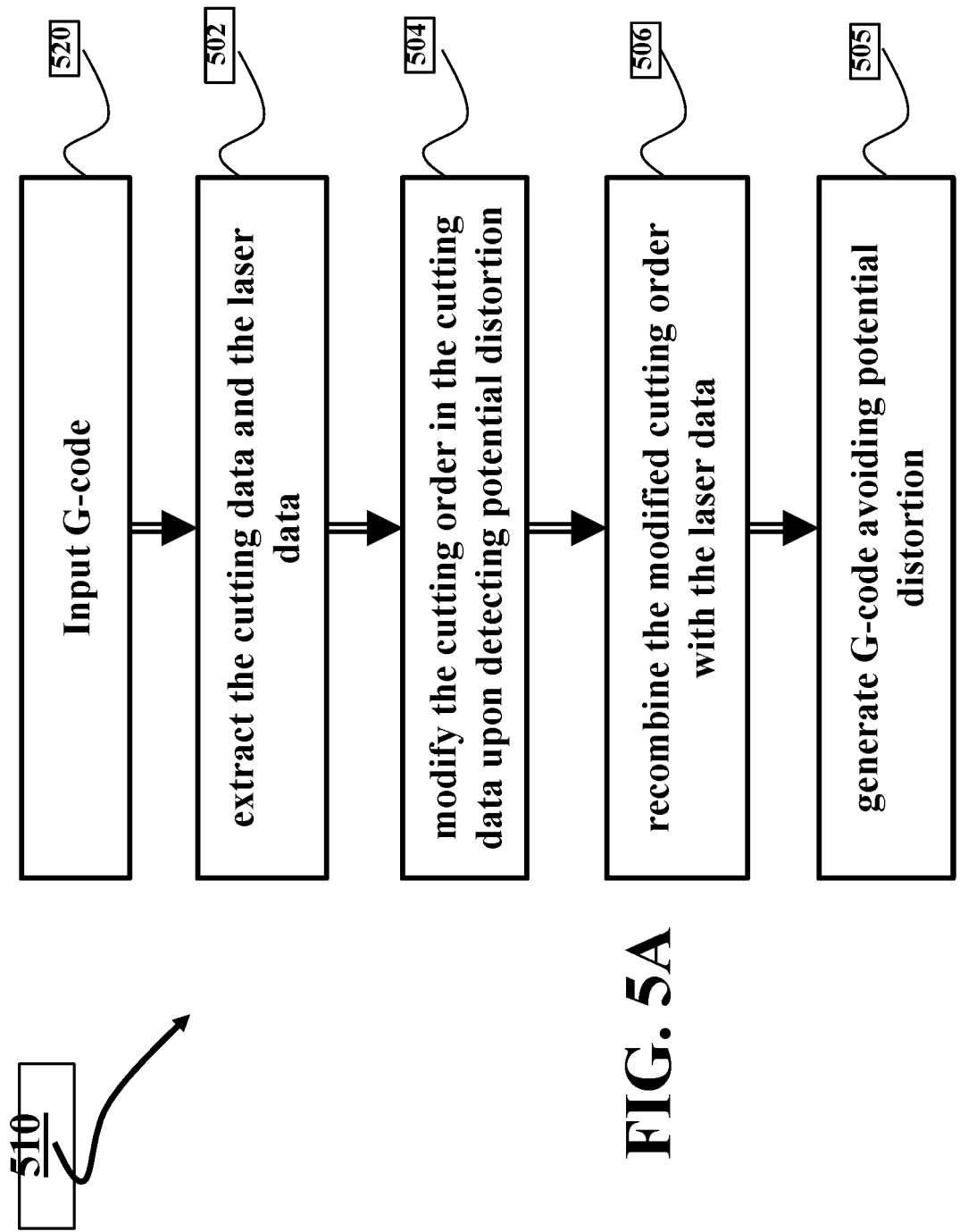
FIG. 5A shows a block diagram of a method for generating G-code that avoids potential distortion from cutting data specified in an input G-code according to one embodiment.

FIG. 5A shows a block diagram of a method for generating G-code that avoids potential distortion from cutting data specified in an input G-code according to one embodiment. This embodiment is advantageous for testing G-code generated by legacy G-code generators. The embodiment uses a processor 510 coupled with stored instructions implementing the method. The instructions, when executed by the processor carry out steps of the method.

The embodiment uses an input interface to receive an input G-code 520 including the cutting data and laser data specifying modes of operation of the laser-cutting machine. The embodiment interprets, e.g., simulates, the input G-code to extract 502 the cutting data and the laser data; modifies 504 the cutting order in the cutting data upon detecting the potential distortion, and recombines 506 the modified cutting data with the laser data to generate the G-code 505 avoiding the potential distortion.

For example, in some implementations, the embodiment partitions G-code into three data arrays. The first array stores commands related to the cutting data used in the path analysis. The second array is a cell array that stores lines of G-code related to laser data that are not used in path analysis, but which is kept in order to later construct a modified cutting path. The third array stores pointers into the first and second arrays, to keep account of where each line of the original G-code file is stored. The third array allows to recombine 506 modified first array with unmodified second array to generate G-code 505 avoiding the potential distortion.

Additionally, or alternatively, the cutting data can be determined from a design data, e.g., by a computer aided manufacturing (CAM) program processing a computer aided design (CAD) file specifying geometry of the parts to be cut by the laser-cutting machine. Various embodiments test the cutting data for potential distortion and generate G-code from the cutting data that avoids the potential distortions.

Figure 5B:
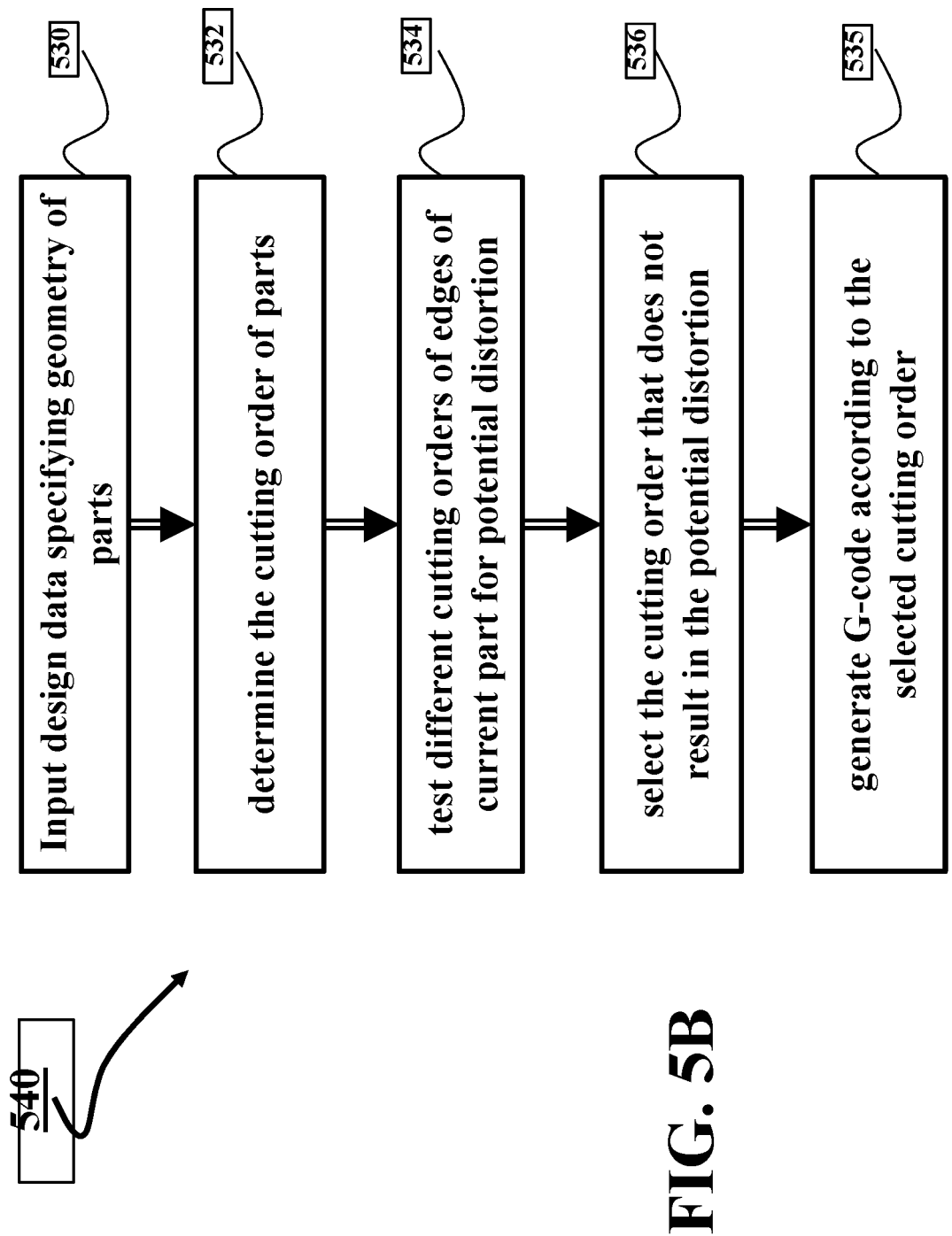
FIG. 5B shows a block diagram of a method for generating G-code that avoids potential distortion from design data specifying geometry of the parts to be cut by the laser-cutting machine according to one embodiment.

FIG. 5B shows a block diagram of a method for generating G-code that avoids potential distortion from design data specifying geometry of the parts to be cut by the laser-cutting machine according to one embodiment. This embodiment is advantageous for generating G-code that avoids the potential distortions using various computer aided manufacturing (CAM) programs. The embodiment uses a processor 540 coupled with stored instructions implementing the method. The instructions, when executed by the processor carry out steps of the method.

The embodiment of FIG. 5B, upon receiving design data 530 specifying geometry of the parts to be cut by the laser-cutting machine, determines 532 the cutting order of parts, and sequentially for each part generates the G-code 535 that avoids the potential distortions. For example, the embodiment, for generating G-code for a current part, tests 534 different possible cutting orders 534 of edges of the current part having the specified geometry for potential distortion, selects 536 the cutting order of edges of the current part that does not result in the potential distortion, and generates 535 the G-code according to the selected cutting order.

For example, in one embodiment, the cutting order of parts specifies the cutting of parts starting in one corner of the sheet of material and proceeding to the diagonally opposite corner of the sheet of material. To simplify the selection of the cutting order of edges, the embodiment generates the G-code in which the final edge for each part is closer to the diagonally opposite sheet corner than to the original sheet corner. This ensures that final cuts are never adjacent to previously cut edges.

Figure 5C:
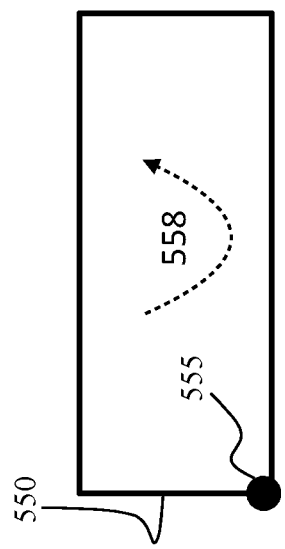
FIGS. 5C, 5D, 5E, and 5F show different examples of final edges used by different embodiments.
Figure 5D:
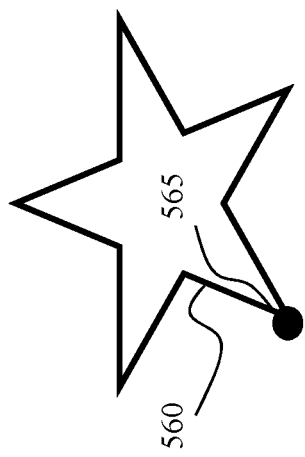

FIGS. 5C-5F show different examples of final edges used by different embodiments. Different embodiments may use the same or different tests to identify the final edge that is cut last to finish cutting of a part. In all examples the cutting direction is counter-clockwise 558. For example, FIG. 5C shows an example when all edges of a part are straight segments identified by changing the direction of cutting. In this example, the final edge is the final straight segment 550 leading to the starting point of cutting 555. Similarly, In FIG. 5D, the final edge is the final straight segment 560 leading to the starting point of cutting 565.

Figure 5E:
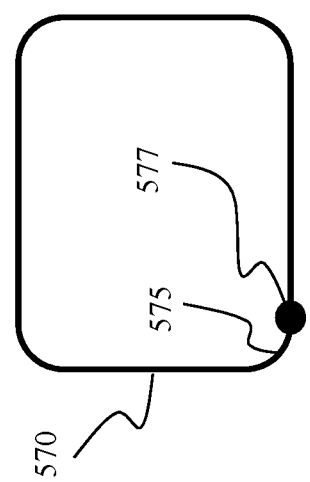
Figure 5F:
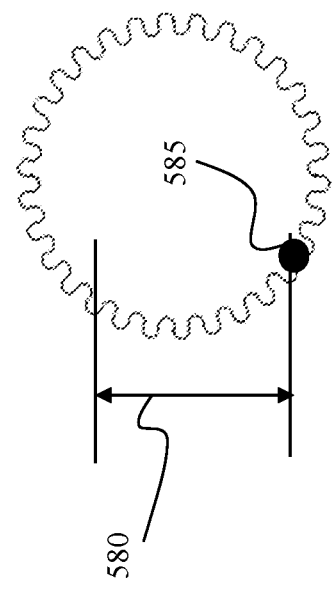

However, in different embodiments, the parts can have arbitrarily shape formed not only by the straight segments as in FIG. 5E, but without any straight segments at all as in FIG. 5F. In the example of FIG. 5E, some embodiments select as the final edge the last straight segment 570 before the starting point of cutting 577. These embodiments consider that straight segments more often contribute to the formation of the thin strut. Additionally, or alternatively, however, some embodiments can combine the straight segment with segments of other shapes. For example, in one implementation, the final edge includes the straight segment 570 and an arc 575 connecting straight segments of a part of FIG. 5E. In another implementation, only the arc 575 is considered as final edge. In yet another implementation, predetermined portion of a perimeter, e.g., last third or quarter of perimeter of a part leading to the starting point of cutting 585, is considered the final edge 580.

Different embodiments use different techniques to test whether the final edge is adjacent to a previously cut part that could cause the potential distortion. For example, one embodiment assumes that the parts for cutting are densely packed on the worksheet, so if the final edge of the part is oriented toward the previously cut part, the potential distortion is detected. Additionally, or alternatively, some embodiments test whether the final edge indeed forms a sufficiently thin strut with an edge of previously cut part.

For example, referring back to FIG. 2, some embodiments detect the potential distortion when the distance between the final edge 202 of the current part 144 and the adjacent edge 204 of the previous part 146 is determined to be less than a predefined distance (i.e., a smallest distance). In some implementations, one embodiment determines a length of the strut 206 along the parallel portions of the edges and detects the potential distortion when the length of the strut 206 along the parallel portions is at least twice as long as a width of the strut 206 defined by the smallest distance. This number can vary among different implementations based on one or a combination of a speed of cutting, a thickness of the sheet of material 142, a laser power, and a type of material forming the sheet of material 142. The type of material is typically metal because they experience thermal expansion, but is not limited to metals, and may include, paper, wood, acrylic, and the like.

In some embodiments, the distortion is detected by utilizing image processing techniques. Examples of the image processing techniques are, but not limited to, morphology and other image processing techniques capable of analyzing geometrical structures. Morphology (also known as "mathematical morphology") is a theory and technique for the analysis and processing of geometrical structures, based on set theory, lattice theory, topology, and random functions.

The morphological dilation operation results in generation of a dilated shape around outlines of the parts to which the morphological dilation operations are applied. In some embodiments, the potential distortion of a current part is detected when at least a portion of the final edge of the part intersects the dilated shape of a previous part scheduled to be cut before the current part. In effect, the morphological dilation simplifies detection of the thin strut that can cause the potential bowing distortion of parts of arbitrarily shapes.

Figure 6B:
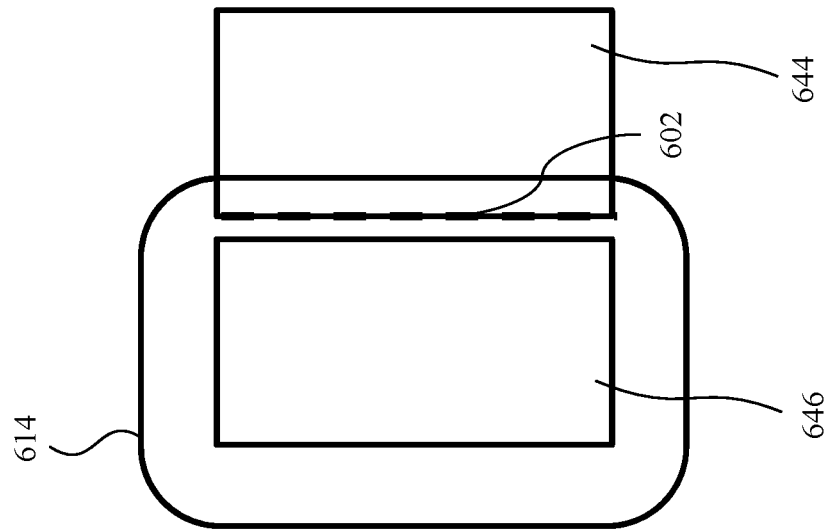
FIGS. 6A and 6B show a schematic of detection of edges susceptible to distortion using morphological dilation according to some embodiments.
Figure 6A:
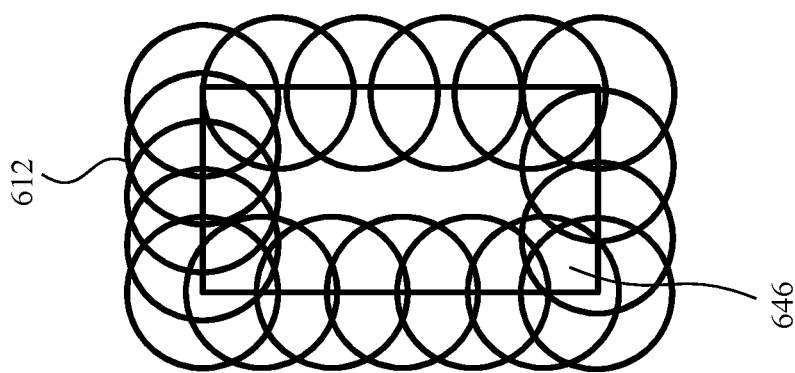

FIGS. 6A and 6B show a schematic of detection of edges susceptible to distortion using morphological dilation according to some embodiments. Specifically, FIG. 6A shows a schematic of application of the morphological dilation to the previous part 646. Such a morphological dilation expands the shape of the previous part 646 according to a kernel 612. FIG. 6B shows a schematic for detection of the potential distortion when at least a portion of final edge 602 of the current part 644 intersects with the expanded shape 614 of the previously cut part 646.

The morphological dilation operation (also known as "morphological dilation") is an operation where pixels are added to the boundaries of objects in an image to extend the outline of the object. The morphological dilation operation is based on two pieces of data as inputs—the input shape which is to be dilated and a set of coordinate points known as a structuring element (also known as "a kernel"). The kernel is a closed shape, where the shape or radii of the kernel is a free parameter and depends on, for example, the thermal and mechanical properties of the sheet of material 142, cutting speed of the laser-cutting machine 118, a laser power, and thickness of the sheet of material 142.

Some embodiments select a kernel 612 based on one or combination of the speed of cutting, the thickness of the sheet of material 142, the laser power, and the type of material forming the sheet of material 142 for the morphological dilation operation. For example, in some embodiments, the kernel 612 is selected automatically from a collection of allowable kernels using a mapping algorithm whose input features include, but are not limited to, one or a combination of the sheet of material 142, the laser power, and the type of material forming the sheet of material 142. Examples of such mapping algorithms are machine learning classifiers such as decision trees or neural networks.

Referring to FIG. 6A, one embodiment tests for potential distortion by first applying morphological dilation operations to previously cut parts and second by detecting the edges of the current part that are susceptible to the distortion by noting when those edges intersect the dilated area. In the morphological dilation operation, the embodiment extends an outline of the previous part 646 by a sequence of kernel 612 such that a shape (i.e. a dilated shape 614) is created around the boundary of the previous part 646 (as shown in FIG. 6B).

Further, the embodiment detects whether the dilated shape 614 intersects with the current part 644. In case the dilated shape 614 is determined to be intersected with the current part 644, the embodiment labels one or more edges of the current part 644 which intersects with the dilated shape 614 as potentially distortable edges. In particular, the embodiment detects whether at least a portion of a final edge 602 of the current part 644 is within boundary of the dilated shape 614. In this case, a portion of the final edge 602 of the current part 644 is detected to be within the boundary of the dilated shape 614 defined by the morphological dilation of the previous part 646, the embodiment detects the potential distortion and labels the final edge 602 as a potentially distortable edge for subsequent correction.

Additionally, or alternatively, some embodiments are based on understanding that the thin strut that can cause the potential bowing distortion does not have to be formed only between two parts, but can form between one part and a combination of previously cut parts. To address this issue, some embodiments maintain a binary image of the sheet of material with pixels of previously cut space corresponding to locations of the previously cut parts dilated by a kernel of a morphological dilation having one value and all other pixels having a different value. Such a binary image allows detection of the potential distortion when at least a portion of the final edge of the current part is within a boundary of the previously cut space. In addition, after processing the current part, some embodiments add the morphological dilation of the current part to the set of previously cut pixels of the binary image by flipping values of pixels corresponding to the morphological dilation of the current part. In such a manner, the binary image is formed for testing next parts for the potential distortions.

Figure 7A:
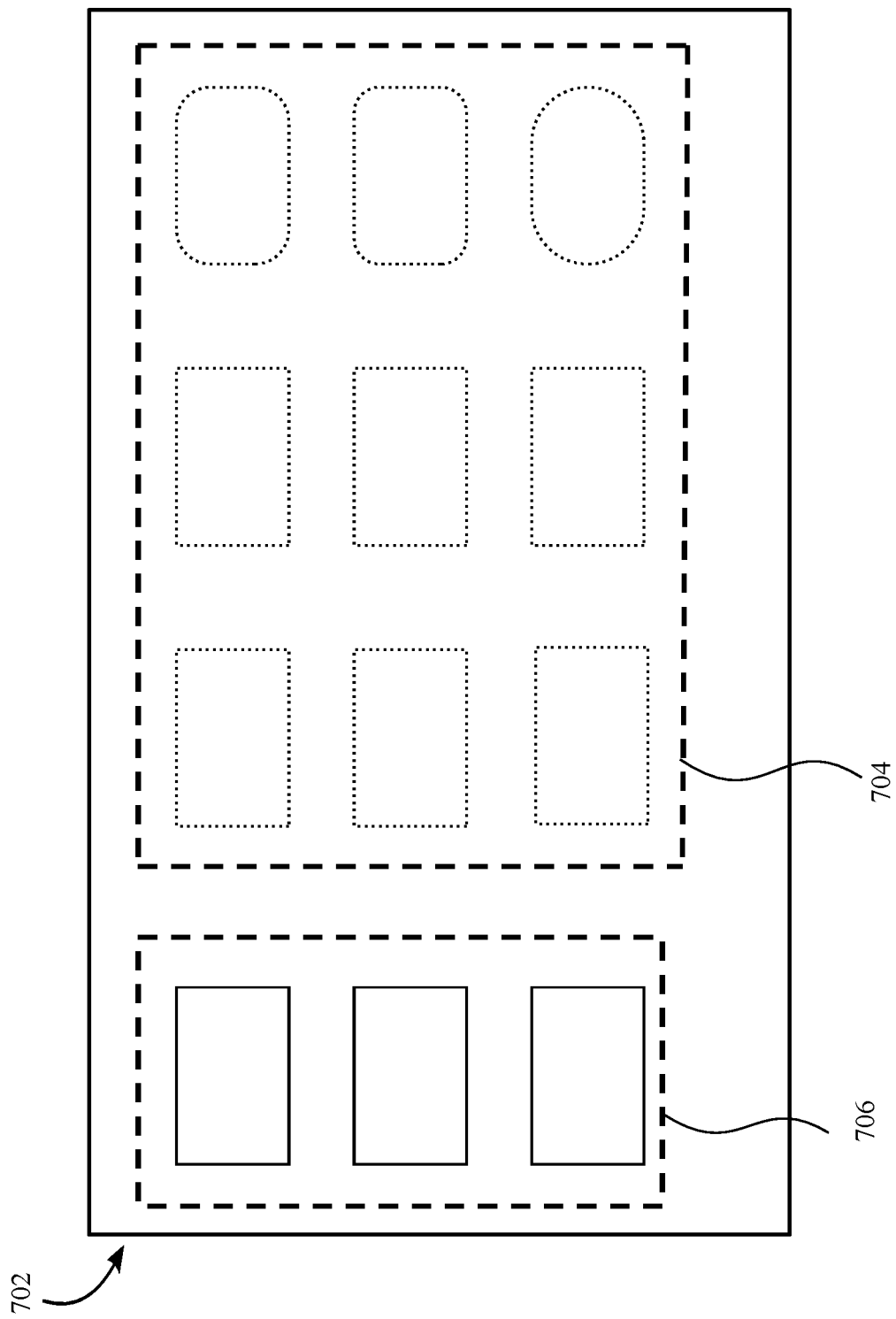
FIGS. 7A and 7B show a schematic of a map image used by some embodiments to simplify detection of the potential distortion.
Figure 7B:
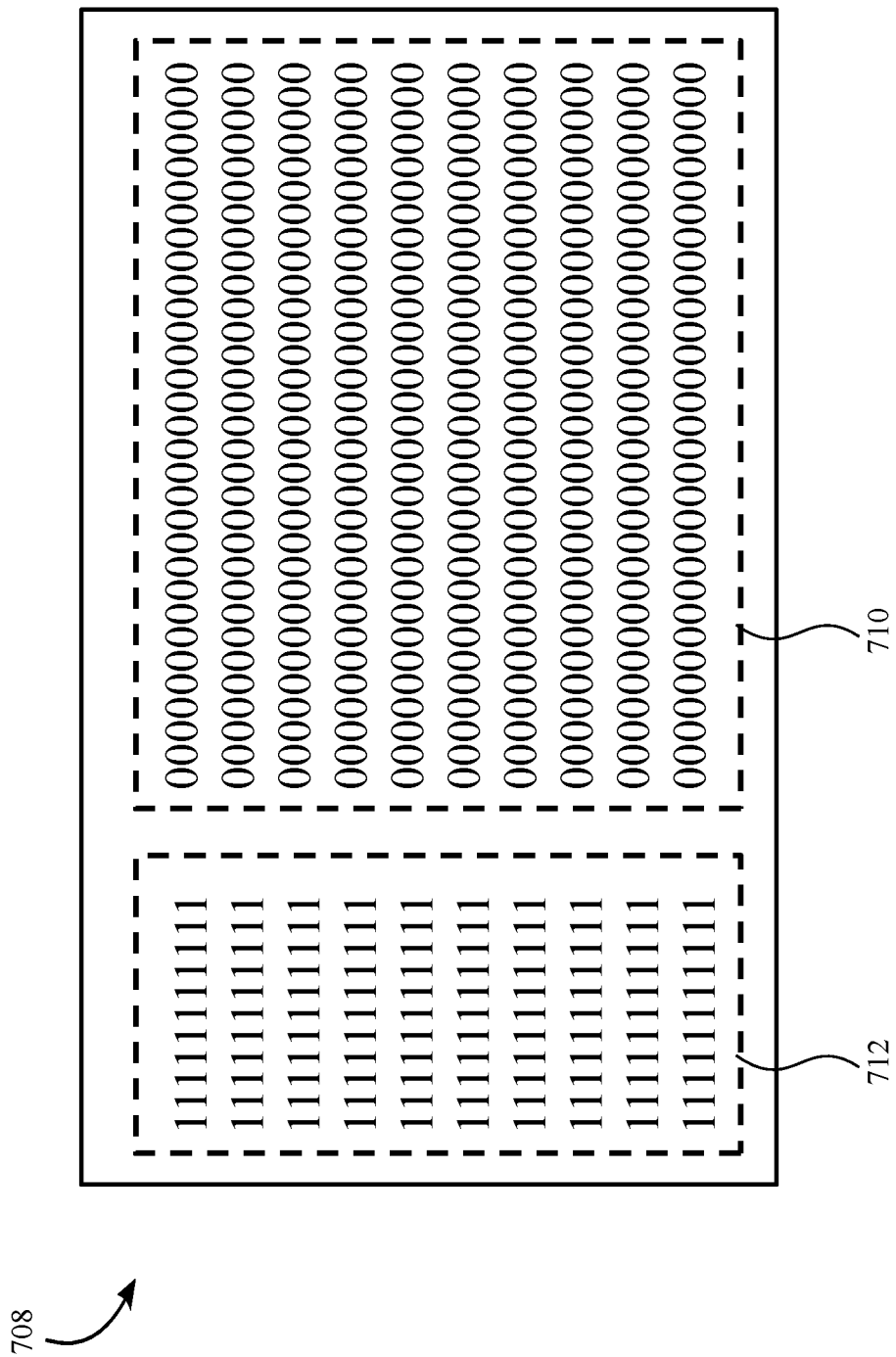

FIGS. 7A and 7B show a schematic of a map image used by some embodiments to simplify detection of the potential distortion. FIG. 7A shows a schematic 702 that represents a set of previous parts 706 that have been cut and a set of next parts 704 to be cut from the sheet of material 142. The set of next parts 704 corresponds to the current part 144 and the next part 148. Further, each of the set of previous parts corresponds to the previous part 146. FIG. 7B shows a schematic that represents a map image 708. The map image 708 includes a set of 0's 710 that represents the set of next parts 704, and a set of 1's 712 that represents the set of previous parts 706 that has been cut. The set of 0's 710 corresponds to a set of "0" pixels and the set of 1's 712 corresponds to a set of "1" pixels.

The map image 708 may be a binary image that includes pixels comprising the set of 0's 710 and the set of 1's 712, where "0" pixel may represent open sheet of material for the laser-cutting, and "1" pixel may represent the set of dilated previous parts as the parts that have been cut. As the sheet of material 142 includes a plurality of parts, these embodiments are configured to compare parts that are to be cut near previously cut parts in order to detect the potential distortion.

To that end, after processing the current part 144, the embodiments add the morphological dilation of the current part 144 to the map image 708 by flipping values of the pixels corresponding to morphological dilation of the current part 144.

For instance, in one embodiment, a value of the pixels corresponding to the current part 144 that is to be cut is "0". After the current part 144 is cut, the current part 144 is morphologically dilated in order to check for the potential distortion in the next part 148 that is to be cut. Then, the embodiment changes the value of the pixels of the dilated current part 144 from "0" to "1" in the map image 708. Similarly, the embodiment updates the map image 708 by flipping values of the pixels of other dilated parts as they are cut from "0" to "1", based on the cutting of the parts from the sheet of material 142.

Some embodiments use a processor and a memory to create the map image 708 for the set of previous parts 706 (e.g., the previous part 146) as dilated by the kernel 612 for detection of the potential distortion. More specifically, after a part is cut, the part is dilated by the kernel 612 based on application of the morphological dilation operation. Further, the dilated part is added to the map image 708 in order to check subsequent parts (the set of next parts 704) for forming a strut with respect to the dilated part.

The map image 708 includes only the set of 0's 710 before the execution of the laser-cutting operations. The "1" pixels may represent previously cut space in the sheet of material 142 after the previous parts (e.g., the previous part 146) are cut. Further, to flip pixels from "0" to "1", the embodiment executes a logical OR operation between the map image 708 and the pixels of the dilated current part that are dilated by the kernel 612 of the morphological dilation operation. Thereafter the embodiment detects the potential distortion when a portion of the final edge 602 of the current part 144 intersects with the previously cut space (i.e. the "1" pixels). This intersection can be determined using a logical AND operation of the edges of the current part 144 with the map 708. The embodiment maintains the map image 708 for the previous cut space based on a logical OR operation of the previous map image and the dilated current part. Further, the embodiment stores the new map image 708 based on the execution of the logical OR operation for detection of potential distortion in subsequent parts.

Figure 8:
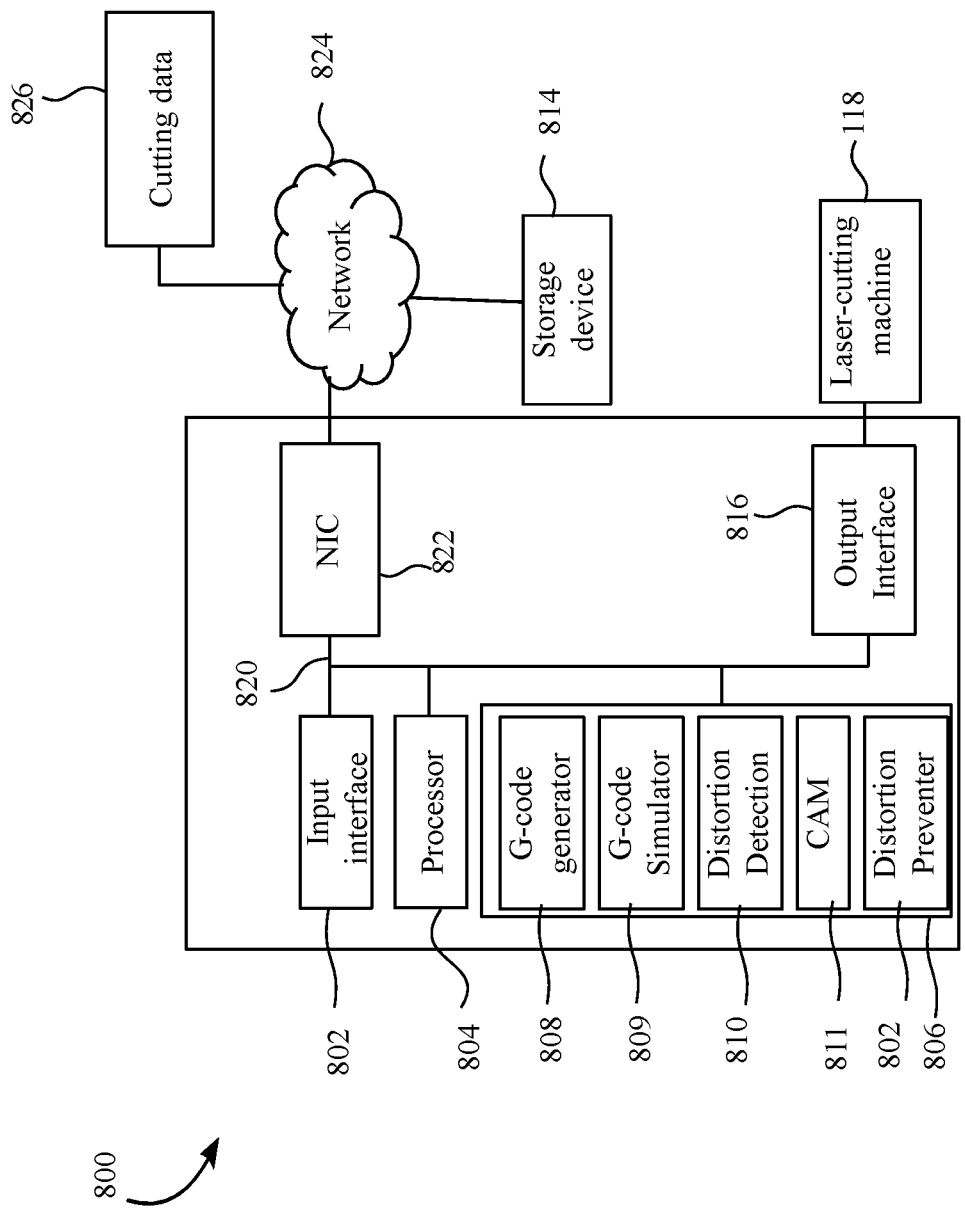
FIG. 8 shows a block diagram of a system 800 for generating a G-code that avoids distortion of parts cut from a sheet of material by a laser-cutting machine according to some embodiments.

FIG. 8 shows a block diagram of a system 800 for generating a G-code that avoids distortion of parts cut from a sheet of material by a laser-cutting machine according to some embodiments. Different embodiments use different combinations of modules of the system 800.

The system 800 includes an input interface 802 configured to accept cutting data 826, from an external device (not shown), for cutting parts from a sheet of material by a laser-cutting machine 118. Further, the system 800 includes a network interface controller (NIC) 822 adapted to connect the system 800 through a bus 820 to a network 824. Through the network 824, either wirelessly or through wires, the system 800 may receive the cutting data 826 and may store the cutting data 826 for use by a G-code generator module 808. The cutting data 826 may be a part of programming code, i.e., a G-code, that is executed on the laser-cutting machine 118 in order to cut parts from the sheet of material. In this situation, the G-code generator module 808 outputs the modified G-code. Additionally, or alternatively, cutting data 826 can be a part of design information sufficient to generate the G-code. For example, in one embodiment, the cutting data 826 include a computer aided design (CAD) file, such that the G-code generator module 808 executes a computer aided manufacturing (CAM) program to generate the G-code.

In some implementations, the system 800 is connected to an output interface 816 through the bus 820 adapted to connect the system 800 to laser-cutting machine 118 that can operate based on G-code generated by the system 800. Accordingly, the laser-cutting machine 118 is operatively coupled to the system 800 in such a way that the laser-cutting machine 118 performs operations in accordance with the G-code received from the system 800. In some other embodiments, the system 800 is operatively coupled to a plurality of laser-cutting machines.

The system 800 includes a memory 806 that stores instructions executable by a processor 804. The processor 804 may be configured to execute the stored instructions in order to control operations of the system 800. The processor 804 may be a single core processor, a multi-core processor, a graphics processing unit (GPU), a computing cluster, or any number of other configurations. The memory 806 may include random access memory (RAM), read only memory (ROM), flash memory, or any other suitable memory systems. The memory 806 stores one or a combination of modules of the system 800, such as a G-code generator module 808 configured to generate G-code from modified input G-code, a cutting distortion detection module 810 configured to detect the potential distortion, and a distortion preventer module 812 configured to test and select a cutting order avoiding potential distortion, G-code simulator 809 configured to simulate an operation of laser-cutting machine 118 in order to extract the cutting orders of parts and edges of the parts, and a CAM module 811 configured to generate G-code from a CAD file by using the distortion detection module 810 and testing for a cutting order that avoid the distortions.

In some implementations, the system 800 includes an output interface 816 configured to output the generated G-code that avoids potential distortions. The output interface 816 is adapted to connect the system 800 to the laser cutting machine 118. The laser-cutting machine 118 receives the generated G-code from the system 800 and performs the laser-cutting operations. More specifically, the actuator (i.e., the motor 134) of the laser-cutting machine 118 executes the operations of the laser-cutting machine 118 based on the G-code generated by the system 800.

In some implementations, the system 800 is integrated in the laser-cutting machine 118 such that the laser-cutting machine 118 is a standalone device that generates the modified G-code in order to cut the parts from the sheet of material 142 without distortion. Additionally, or alternatively, in some embodiments, the generated G-code is transmitted, via the network 824, to a storage device 814 (such as a file server) in order to store the generated G-code such that the generated G-code can be accessed by other devices (e.g., laser-cutting machines, or any machine capable of executing laser-cutting operations based on the G-code) without communicating with the system 800.

Figure 9A:
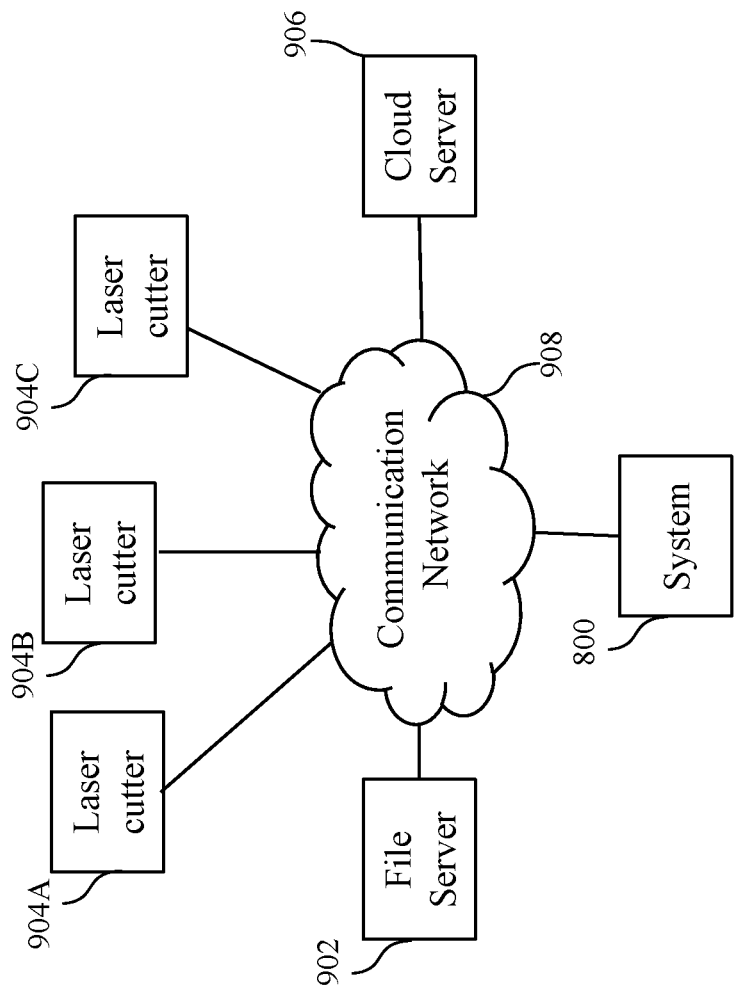
FIG. 9A shows a schematic of transmission of the generated G-code to a plurality of external devices according to some embodiments.

FIG. 9A shows a schematic of transmission of the generated G-code to a plurality of external devices according to some embodiments. In these embodiments, the system 800 is communicatively coupled to a file server 902, a plurality of laser cutters 904A, 904B, and 904C, and a cloud server 906 via a communication network 908.

Each of the plurality of laser cutters 904A-904C corresponds to the laser cutter machine 118. The communication network 908 corresponds to the network 824. Accordingly, description of the plurality of laser cutters 904A-904C and the communication network 908 is omitted from the disclosure for the sake of brevity.

In some embodiments, the system 800 may transmit the generated G-code to the file server 902 which is further accessed by other devices (e.g., the plurality of laser cutters 904A-904C) from the file server 902. The file server 902 is a computer attached to a network (i.e. the network 908), where the file server 902 stores the data received from one or more devices (i.e., the system 800) and provides the data to client computers (e.g., the laser-cutting machine 118) by use of a file transfer protocol (FTP) or any other suitable communication protocol. The file server 902 may also store the modified G-code for a long term such that the modified G-code is accessed in future for cutting parts with same specifications.

In some additional or alternative embodiments, the system 800 may transmit the generated G-code to the cloud server 906. The cloud server 906 is a virtual server running in a cloud computing environment, where the cloud computing is an on-demand availability of computer system resources, especially data storage, servers, software applications, and the like. More specifically, the cloud computing provides different services to users over the internet. Accordingly, the cloud server 906 stores the modified G-code received from the system 800 via communication network 908 in order to provide access to the modified G-code in future. Additionally, or alternatively, the G-code is generated on the cloud server. For example, the cloud server 906 received the cutting data, original G-code, and/or design data specifying geometry of parts, generates G-code that avoid potential distortions and transmits the generated G-code to the laser cutting machine or to the storage.

Figure 9B:
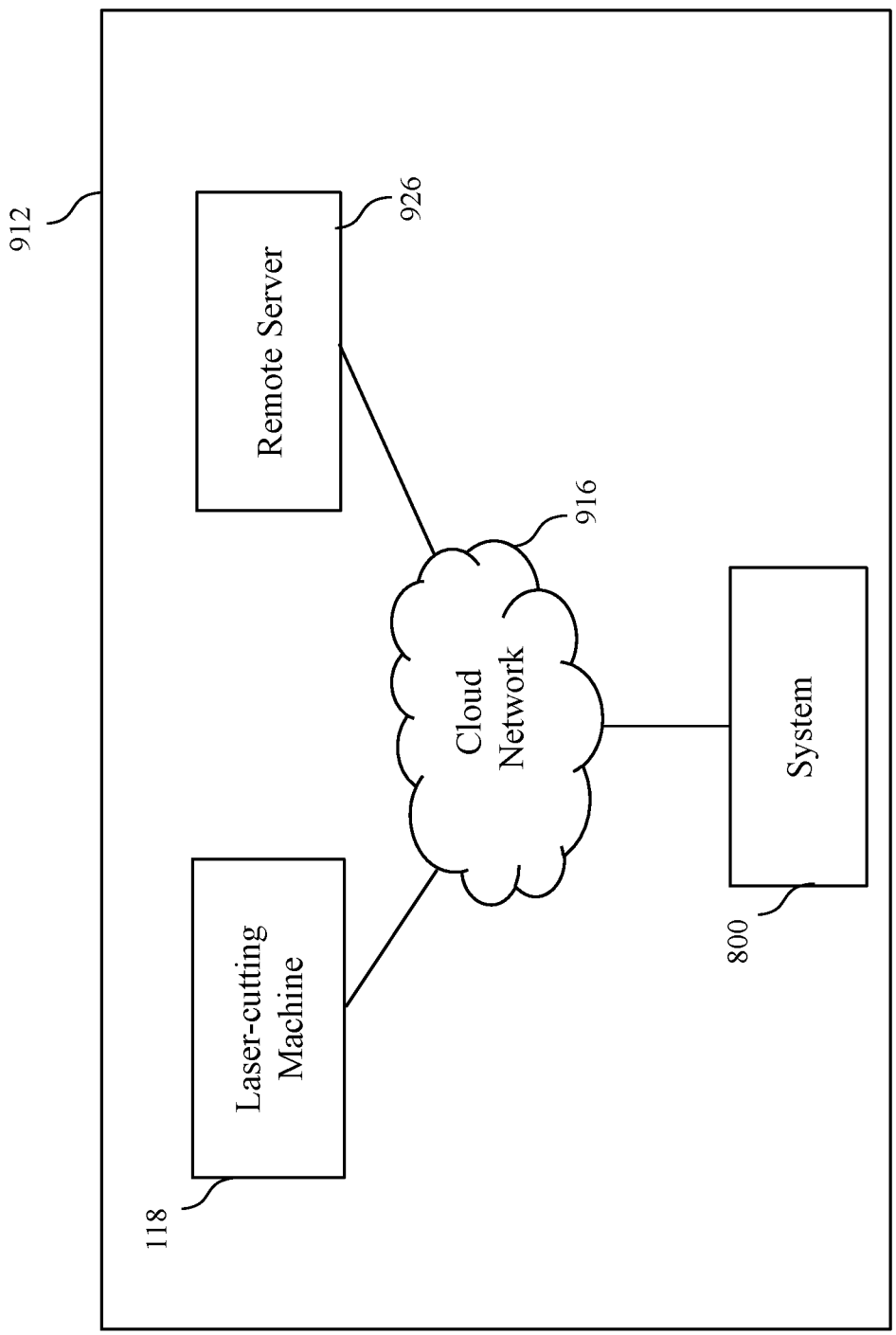
FIG. 9B shows a schematic of integration of the system 800 generating G-code that avoids potential distortion in a cloud computing infrastructure according to some embodiments.

FIG. 9B shows a schematic of integration of the system 800 generating G-code that avoid potential distortion in a cloud computing infrastructure according to some embodiments. In some implementations of these embodiments, the cloud computing infrastructure 912 also includes the laser-cutting machine 118 and a remote server 926 connected to each other via a cloud network 906. The cloud computing infrastructure 912 is a collection of hardware and software elements needed to enable the cloud computing. The cloud computing includes computing power, networking, and storage, as well as an interface for users to access their virtualized resources. The virtual resources mirror a physical infrastructure, with components like servers, network switches, memory, and storage clusters. The cloud network 916 is a computer network that provides interconnectivity between cloud enabled applications to provide access to the virtualized resources. Further, the remote server 926 is configured to store the generated G-code of the system 800. In the cloud computing infrastructure 912, the laser-cutting machine 118 may be configured to execute the cloud based applications such that laser-cutting machine 118 is configured to retrieve the generated G-code from the remote server 926 via the cloud network 916. Accordingly, the laser-cutting machine 118 executes the laser-cutting operations based on the G-code generated by the system 800 and retrieved from the remote server 926.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, if understood by one of ordinary skill in the art the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

The invention claimed is:

1. A computer-based system for generating a G-code for controlling an operation of a laser-cutting machine to cut parts from a sheet of material, the system comprising:
 a processor configured, upon receiving cutting data specifying a cutting order of parts and a cutting order of edges of each part, to test the parts for potential distortions caused by the cutting according to the cutting data, wherein, for testing a current part, the processor is configured to
  detect a potential distortion for cutting a final edge of the current part according to the cutting order of edges for the current part, when the final edge of the current part is adjacent to an edge of a previously cut part scheduled for cutting before the current part according to the cutting order of parts;
  modify the cutting order of the edges of the current part;
  select a modified cutting order for which the final edge is not adjacent to any edge of any previously cut part, so that the selected cutting order does not result in the potential distortion of cutting the current part; and
  generate a G-code with the cutting order of the edges of the current part selected to avoid the potential distortion; and
 an output interface configured to transmit the generated G-code over a wired or wireless channel to control the laser-cutting machine.

2. The system of claim 1, further comprising:
 an input interface configured to receive an input G-code including the cutting data and laser data specifying modes of operation of the laser-cutting machine, wherein the processor is configured to
 interpret the input G-code to extract the cutting data and the laser data;
 modify the cutting order in the cutting data upon detecting the potential distortion; and
 recombine the modified cutting data with the laser data to generate the G-code avoiding the potential distortion.

3. The system of claim 2, wherein the cutting data specify commands to the laser-cutting machine to move a laser head to specified locations, wherein the processor executes a simulator stored in a memory operatively connected to the processor to simulate motion of the laser head to determine the cutting order of the parts and the cutting order of the edges of each part.

4. The system of claim 2, wherein the processor modifies the cutting order of the edges of the current part from a clockwise order to a counterclockwise order or from the counterclockwise order to the clockwise order.

5. The system of claim 2, wherein the processor modifies the cutting order of edges of the current part by changing a location of an initial starting point of cutting the edges of the current part.

6. The system of claim 1, further comprising:
 an input interface configured to receive design data specifying geometry of the parts to be cut by the laser-cutting machine, wherein the processor is configured to determine the cutting order of parts, and sequentially for each part including the current part configured to
  test different cutting orders of edges of the current part having the specified geometry for potential distortion;
  select a cutting order of edges of the current part that does not result in the potential distortion; and
  generate the G-code according to the selected cutting order.

7. The system of claim 1, wherein the final edge of the current part is the last straight edge scheduled for cutting according to the cutting order of the edges of the current part.

8. The system of claim 1, wherein the processor detects the potential distortion when at least a portion of the final edge of the current part is within a boundary of a shape defined by a morphological dilation of the previously cut parts.

9. The system of claim 8, wherein a kernel of the morphological dilation is selected based on one or combination of a speed of cutting, a thickness of the sheet of material, a laser power, and a type of material forming the sheet of material.

10. The system of claim 1, wherein the processor maintains a binary image of the sheet of material with pixels of previously cut space corresponding to locations of the previously cut parts dilated by a kernel of a morphological dilation having one value and all other pixels having a different value, wherein the processor detects the potential distortion when at least a portion of the final edge of the current part is within a boundary of the previously cut space.

11. The system of claim 10, wherein, after processing the current part, the processor adds the morphological dilation of the current part to the previously cut space of the binary image by flipping values of pixels corresponding to the morphological dilation of the current part.

12. The system of claim 1, wherein the cutting order specifies cutting from a starting corner of the sheet of material to the diagonally opposite corner of the sheet of material, and wherein in the generated G-code the final edge cut for each part is closer to the diagonally opposite sheet corner than to the original sheet corner.

13. The system of claim 1, wherein the output interface transmits the generated G-code to the laser-cutting machine causing the laser-cutting machine to cut the parts from the sheet of material according to the generated G-code.

14. The system of claim 1, wherein the output interface transmits the modified code to a set of laser-cutting machines causing each of the laser-cutting machines in the set to cut the parts from the sheet of material according to the generated G-code.

15. The laser-cutting machine operatively connected to the system of claim 1, comprising:
 an actuator configured to execute the operation of the laser-cutting machine according to the generated G-code.

16. A cloud computing infrastructure, comprising:
 the system of claim 1, the laser-cutting machine, a remote server, and a G-code generator, wherein the system of claim 1 is configured to modify the G-code received from the G-code generator to generate the G-code avoiding the potential distortion and store the generated G-code at the remote server, wherein the laser-cutting machine is configured to retrieve the generated G-code from the remote server.

17. A cloud computing infrastructure, comprising:
the system of claim 1, the laser-cutting machine, a remote server, and a G-code generator, wherein the system of claim 1 is configured to select for each part a cutting order of its edges that does not result in the potential distortion, pass the selected cutting order to the G-code generator and store the generated G-code at the remote server, wherein the laser-cutting machine is configured to retrieve the generated G-code from the remote server.

18. A method for reducing distortion of parts cut from a sheet of material by a laser-cutting machine, wherein the method uses a processor coupled with stored instructions implementing the method, wherein the instructions, when executed by the processor carry out steps of the method, comprising:
testing the parts for potential distortions during the cutting according to a cutting order of parts and a cutting order of edges of each part, wherein testing a current part includes
detecting a potential distortion for cutting a final edge of the current part according to the cutting order of edges for the current part, when the 9 final edge of the current part is adjacent to an edge of a previously cut part scheduled for cutting before the current part according to the cutting order of parts;
selecting a cutting order of the edges of the current part such that the final edge is not adjacent to any edge of any previously cut part; and
generating a G-code with the selected cutting order of the edges; and
transmitting the generated G-code over wired or wireless channel to control the laser-cutting machine.

19. The method of claim 18, wherein the memory maintains a binary image of the sheet of material with pixels of previously cut space corresponding to locations of the previously cut parts dilated by a kernel of a morphological dilation having values different from values of other pixels, wherein the method detects the potential distortion when a portion of the final edge of the current part intersects with the previously cut space.

20. A non-transitory computer readable storage medium embodied thereon a program executable by a processor for performing a method for reducing distortion of parts cut from a sheet of material by a laser-cutting machine, the method comprising:
testing the parts for potential distortions during the cutting according to a cutting order of parts and a cutting order of edges of each part, wherein testing a current part includes
detecting a potential distortion for cutting a final edge of the current part according to the cutting order of edges for the current part, when the final edge of the current part is adjacent to an edge of a previously cut part scheduled for cutting before the current part according to the cutting order of parts;
selecting a cutting order of the edges of the current part such that the final edge is not adjacent to any edge of any previously cut part; and
generating a G-code with the selected cutting order of the edges; and
transmitting the generated G-code over wired or wireless channel to control the laser-cutting machine.

\* \* \* \* \*